United States Patent [19] [11] 4,339,218
Navarre [45] Jul. 13, 1982

[54] SELF-LOCKING FASTENER

[76] Inventor: Rene' A. Navarre, 408 E. Wright St., Pensacola, Fla. 32501

[21] Appl. No.: 146,478

[22] Filed: May 5, 1980

[51] Int. Cl.$^3$ ............................................. F16B 25/00
[52] U.S. Cl. .................................................. 411/419
[58] Field of Search ............... 411/419, 418, 417, 420, 411/386, 387, 378, 393, 181, 176, 177, 166, 183

[56] References Cited

U.S. PATENT DOCUMENTS 1,729,670 10/1929 Holland ............................. 411/419
2,017,550 10/1935 Scherer ............................. 411/418
2,292,195 8/1942 Brown ............................. 411/418 X

FOREIGN PATENT DOCUMENTS 1168170 4/1964 Fed. Rep. of Germany ...... 411/176
110998 11/1917 United Kingdom ............... 411/419

Primary Examiner—Ramon S. Britts
Attorney, Agent, or Firm—Guy E. Matthews

[57] ABSTRACT

A fastener for use in soft materials, such as wood, dry wall, and the like, is provided with a shank having a conical void and longitudinal slots in the leading end thereof, forming flexible fingers which bottom in a hole formed in the material to be fastened and flare radially outwardly as material is trapped in the void as the fastener is advanced. In a second embodiment, a shank having a longitudinal slot extending substantially the full length of the shank defines fingers which flare outward as the fastener advances in softer materials. Means for resisting removal of the fastener are provided formed on the fingers.

5 Claims, 8 Drawing Figures

SELF-LOCKING FASTENER

BACKGROUND OF THE INVENTION

Field of the Invention

This invention relates to fasteners for relatively soft materials which are self-locked in position by flaring expansion of the fastener shank as it is advanced in the material to be fastened.

Two desirable characteristics of fasteners are high resistance to pulling out when subjected to a tensile load and resistance to backing out by unscrewing. It is particularly difficult to obtain those characteristics when the fastener must be used in materials such as wood, plastic, sheetrock, and the like. These materials are often not as strong as the fastener, leading to stripping of the threads in the material and pulling-out of the fastener. Locking a fastener in such material also presents a problem for the same reason.

It is desirable that the fastener be a self-contained unit, alleviating the need for nuts and lock washers and therefore access to the backside of the material the fastener is connected with. A prior art approach used for fastening to wood includes a bushing with interior and exterior thread which is threaded into a hole into the wood and receives a fastener in the interior threads. Such a bushing is basically ineffective in sheetrock and the like because of that material's very low strength. Devices for fastening to sheetrock generally require drilling a hole through the material and inserting through the hole a device which expands on the opposite side to provide an increased surface to disperse the force applied to the fastener. A typical example is a toggle bolt.

It is apparent that forming threads in such materials for use with a conventional threaded fastener such as bolts or screws is not wholly satisfactory. There are several prior art devices that provide a good and reliable means of fastening such as materials, however, most, if not all, require the usage of additional parts or special preparation to function effectively.

SUMMARY OF THE INVENTION

It is an object of this invention to provide a simple, one piece expanding fastener for fastening to nonmetallic materials which provides a high tensile holding force and is resistant to stripping or pulling-out of the threads.

A further object of the invention is to provide a simple, inexpensive, one piece expanding fastener with a high tensile or holding force which expands inside soft materials with which the fastener is engaged.

It is further an object of the invention to provide an expanding fastener for nonmetallic materials which resists backing out or unscrewing.

The aims of the invention are achieved by an improved fastener having a head section for driving the fastener into engagement with the material and a shank portion, which may be threaded. The leading end of the shank section, which is the extreme opposite of the head section, has a generally conically shaped void formed therein, the top of which extends up into the shank portion. Longitudinal slots extend through the leading end of the shank into communication with the void, defining a plurality of relatively thin annularly spaced fingers of generally increasing thickness in the direction of the head of the fastener.

For fastening to a relatively strong material, such as wood, the fingers are relatively short. In the case of a threaded screw type fastener, a hole of appropriate diameter for receiving the fastener is drilled in the material to a depth which is less than the length of the fastener. The fastener is threaded into the hole until the fingers contact the base of the hole. Further advancement of the screw forces material into the decreasing volume of the void defined by the fingers, exerting a radially outward force flaring the fingers outwardly and expanding the shank. The fingers offer increased resistance to tensile forces on the fastener. Forming the fingers such that when the screw is advanced into the material the fingers present a cutting edge to the material and retracting or unscrewing the fastener presents the opposite edge of the finger, designed to dig in or jam into the material, gives the fastener a self-locking function whereby it is relatively easy to tighten the fastener and difficult to remove it.

In a second embodiment for fastening in softer materials, for example sheetrock, the conical void and longitudinal slots are extended relatively further into the shank of the fastener to enhance expansion of the fingers created thereby. A hole is drilled in the material only deep enough to engage the threads of the fastener. As the fastener is advanced, material is similarly forced up into the void, causing expansion of the fingers radially outwardly in the material.

DESCRIPTION OF THE PREFERRED EMBODIMENTS

Reference will be made herein to threaded screw-type fasteners, however, it should be understood that the invention is equally applicable to other types of fasteners, including machine threaded fasteners.

Figure 1:
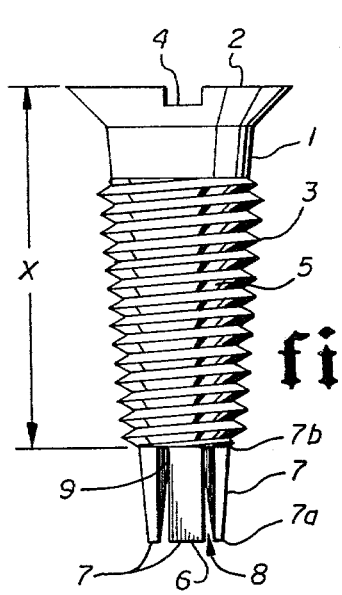
FIG. 1 is a plan view of a screw-type fastener of the invention.
Figure 2:
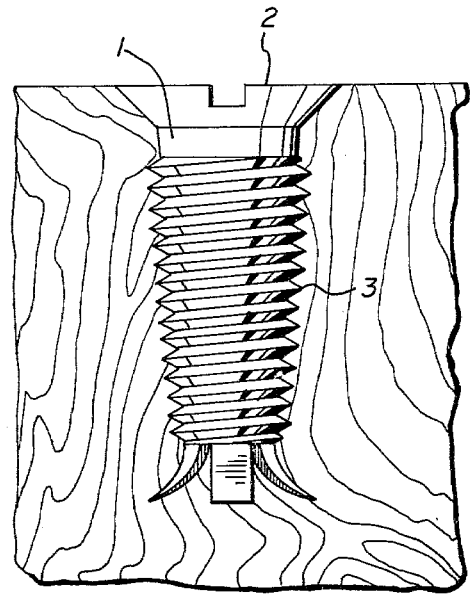
FIG. 2 is a partial plan, partial sectional view of the fastener of FIG. 1 in fully threaded engagement.

With reference to FIGS. 1 and 2, a threaded fastener of the invention is indicated generally at 1 and comprises a head section 2 and a shank section 3. The head portion 2 contains a transverse slot 4 for receiving a conventional screwdriver blade to turn the fastener, engaging the threads 5 with the material and advancing the fastener into the material.

The leading end 6 of the shank has a plurality of spaced-apart fingers 7, separated one from the other by longitudinal slots 9. The fingers surround and define a generally conically shaped void 8 formed in the shank. Although the void may be formed in various configurations, it is preferably cone shaped for reasons which will be made clear below.

For fastening to relatively hard materials, such as wood or plastic, the fastener of the invention as shown in FIG. 1 is preferable. In the usage of this embodiment of the fastener, a pilot hole is drilled in material to be fastened to a depth equal to the distance from the head of the screw to the root 7b of the fingers, as indicated by dimension X in FIG. 1. The fastener is threadably advanced into the material until the tips 7a of the fingers contact the bottom of the pilot hole (not shown). At this point, further advancement of the fastener into the material causes the tips of the fingers 7a to cut into the material. Still further advancement causes that material at the base of the pilot hole to be forced into the decreasing volume of the void 8 defined by the fingers 7. Because the volume available to contain that material decreases as the fastener is advanced, the material exerts a force radially outwardly on the fingers, causing them to flare outwardly of the fastener's longitudinal axis. As shown in FIG. 2, on the fully engaged fastener of the invention, the fingers 7 have flared radially outwardly and in doing so, cut an annular void in the material with a cross sectional configuration like that of the flared fingers.

As best seen in FIG. 2, the flared fingers are disposed at positions wherein they extend outwardly a distance greater than most, if not all, of the threaded portion of the shank. The fingers therefore cause the fastener to have substantially increased resistance to forces in the axial direction to increase the holding strength of the fastener and resist pulling-out. Further, the fingers cause the fastener to resist unscrewing or backing out, due to the fact that the fingers must be deformed radially inwardly to unscrew and remove the fastener.

Figure 8:
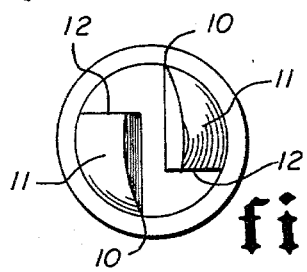
FIG. 8 is a bottom view of a non-backout fastener of the invention.

The ease with which the fingers are flared as the fastener engages with the material is increased if the fingers are shaped as shown in FIG. 8. The leading edge 10 of each finger, that is, the edge which must cut outwardly into the material as the fastener is advanced, is preferably sharpened to form a blade-like surface present to the material. Further, the leading edges of the fingers may be formed such that they tend to cut outwardly and upwardly to enhance the flaring action of the fingers.

The fastener of the invention may be provided with truncated fingers 11, as shown in FIG. 8 to prevent the fastener from being removed from the material in which it is engaged. The trailing edges 12 of the fingers are preferably formed to present a relatively flat surface, generally parallel to the longitudinal axis of the fastener. With reference to FIG. 8, as the fastener is advanced into the material, the blade-like leading edges 10 tend to cut into the material, enhancing the flaring of the fingers. An attempt to remove the fastener, however, will present the relatively flat truncated trailing edge 12 to the material. Because the fingers flared when the fastener was engaged, removing the fastener necessitates the return of the fingers to the original, unflared configuration. The truncated trailing edges 12 resist the unflaring of the fingers by digging into and jamming in the material above the fingers, thereby preventing the removal of the fastener.

Figure 3:
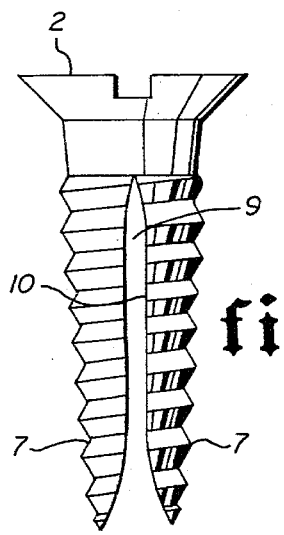
FIG. 3 is a plan view of a second embodiment of the invention for very soft materials.
Figure 4:
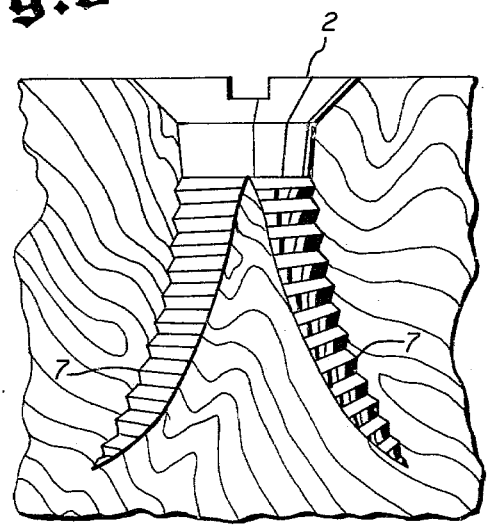
FIG. 4 is a partial plan, partial sectional view of the fastener of FIG. 3 in fully threaded engagement.

FIGS. 3 and 4 depict a second embodiment of the fastener of the invention for use in fastening to relatively soft materials such as sheetrock. In this embodiment, the slot 9 formed in the shank portion may extend substantially further into the fastener because softer materials are more easily cut by the leading edges 10 of the fingers 7 as the fastener is advanced. The operation of this embodiment is identical to that previously described, however, in the use of this fastener, the pilot hole need be drilled into the material only deep enough to engage and start the threads of the fastener. Advancing the fastener causes material to be forced into the void 8 in the shank, exerting an outward force on the fingers and flaring them as the fastener is advanced. Similarly, the leading edges of the fingers may be formed to enhance their cutting action into the material and the trailing edges 12 may be formed in a truncated configuration if the fastener is to be non-removable.

Figure 5:
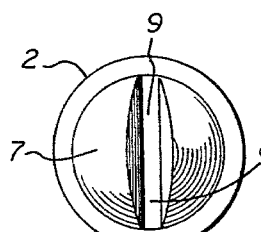
FIG. 5 is a bottom plan view of a two finger fastener of the invention.
Figure 6:
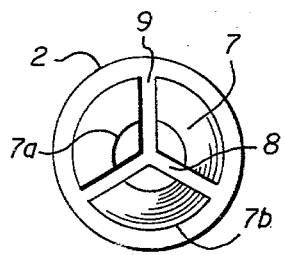
FIG. 6 is a bottom plan view of a three finger fastener of the invention.
Figure 7:
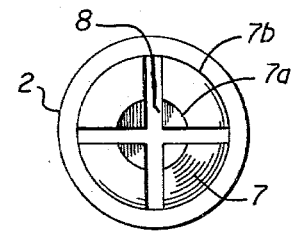
FIG. 7 is a bottom view of a four finger fastener of the invention.

FIGS. 5, 6, and 7 show, respectively, 2, 3, and 4 fingered configurations applicable to both embodiments of the invention and indicate the relationships of the fingers 7, void 8, and slots 9 of each configuration.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of this invention without parting from the scope thereof, it is to be understood that all matter herein set forth are shown in the accompanying drawings is to be interpreted as illustrative and not in a limiting sense.

The invention having been described, what is claimed is:

1. A locking fastener; comprising:
    a head; and,
    a threaded shank connected to the head and having a leading end longitudinally opposite the head, said leading end including an outwardly facing conical void having an open outer end and a plurality of slots defining a plurality of fingers spaced about said void, such that material entering said void through said open outer end when said fastener is advanced forces said fingers to flair radially outwardly, wherein the fingers have a truncated trailing edge whereby reversing the fastener causes the trancated trailing edge to dig into the material and resist withdrawal of the fastener.

2. The locking fastener of claim 1, including means formed on the fingers for cutting radially outwardly into the material to be fastened when the fingers contact and are advanced into the material, thereby promoting flaring of the fingers.

3. A locking fastener, comprising:
    a head; and,
    a threaded shank connected to the head and having a leading end longitudinally opposite the head, including a pair of slots formed in the shank and extending longitudinally from the leading end substantially the full length of said shank and including a void in the shank communicating with the slots and having an opening adjacent the leading end to define a pair of fingers adapted to flair outwardly as the fastener is advanced, said fingers including a truncated trailing edge whereby reversing the rotation of the fastener causes the truncated trailing edge to dig into the material and resist removal of the fastener.

4. The locking fastener of claim 3, wherein the leading end has a generally conically shaped void formed therein, defining fingers on the shank having an inside surface tapering radially outwardly, whereby material forced into the leading end as the fastener is advanced is forced into a decreasing volume flaring the fingers radially outwardly.

5. The locking fastener of claim 3, including means formed on the fingers for cutting radially outwardly into the material to be fastened when the fingers contact and are advanced into the material, thereby promoting flaring of the fingers.

* * * * *